US012776088B2

(12) United States Patent
Nishino et al.

(10) Patent No.: US 12,776,088 B2
(45) Date of Patent: Oct. 27, 2026

(54) REPRODUCTION SYSTEM, REPRODUCTION METHOD, AND STORAGE MEDIUM

(71) Applicant: HONDA MOTOR CO., LTD., Tokyo (JP)

(72) Inventors: Tomoko Nishino, Wako (JP); Masahiro Daimon, Wako (JP); Mikiko Ugajin, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 199 days.

(21) Appl. No.: 18/588,010

(22) Filed: Feb. 27, 2024

(65) Prior Publication Data

US 2024/0331260 A1 Oct. 3, 2024

(30) Foreign Application Priority Data

Mar. 31, 2023 (JP) ................................ 2023-056964

(51) Int. Cl.
*G06T 13/80* (2011.01)
*G06V 20/56* (2022.01)
*G08G 1/01* (2006.01)

(52) U.S. Cl.
CPC ............ *G06T 13/80* (2013.01); *G06V 20/588* (2022.01); *G08G 1/0112* (2013.01); *G08G 1/0125* (2013.01); *G08G 1/0141* (2013.01)

(58) Field of Classification Search
CPC .... G06T 13/80; G06V 20/588; G08G 1/0112; G08G 1/0125; G08G 1/0141; G07C 5/0891; H04N 5/93

(Continued)

(56) References Cited

U.S. PATENT DOCUMENTS 6,246,933 B1 6/2001 Bague
10,235,882 B1 * 3/2019 Aoude .................. G06N 20/00

(Continued)

FOREIGN PATENT DOCUMENTS

CN 103559745 2/2014
CN 103824346 5/2014

(Continued)

OTHER PUBLICATIONS

Japanese Office Action for Japanese Patent Application No. 2022-054926 mailed May 27, 2025.

(Continued)

*Primary Examiner* — Sheree N Brown
(74) *Attorney, Agent, or Firm* — Amin, Turocy & Watson, LLP

(57) ABSTRACT

A reproduction system includes an acquisition unit that acquires parameters related to a relative behavior of a host vehicle in a surrounding environment in a specific traffic section, a time-series parameter storage unit that stores the parameters in a time series as time-series parameter data, and a reproduced moving image generation unit having a focusing point specification unit that specifies focusing points in the specific traffic section, an extraction unit that extracts a group of focusing point parameters related to the focusing points from the time-series parameter data, a calculation unit that calculates feature points at the focusing points by statistically processing the group of focusing point parameters, and a moving image generation unit that generates a moving image for reproducing a movement history of the host vehicle in the specific traffic section on the basis of the feature points.

11 Claims, 5 Drawing Sheets

(58) Field of Classification Search
USPC .......................................................... 345/473
See application file for complete search history.

(56) References Cited

U.S. PATENT DOCUMENTS

| | | | | |
|---|---|---|---|---|
| 2008/0273752 | A1* | 11/2008 | Zhu | G08G 1/166 382/103 |
| 2016/0191886 | A1* | 6/2016 | Tanabe | B60R 1/24 386/240 |
| 2017/0334356 | A1* | 11/2017 | Fujita | B60R 1/002 |
| 2019/0045092 | A1* | 2/2019 | Kitani | B60R 1/23 |
| 2019/0139449 | A1 | 5/2019 | Zhang et al. | |
| 2022/0398853 | A1 | 12/2022 | Nishimura et al. | |
| 2023/0286548 | A1 | 9/2023 | Tanaka et al. | |
| 2023/0322230 | A1 | 10/2023 | Kushibiki | |
| 2024/0083429 | A1 | 3/2024 | Shimizu et al. | |

FOREIGN PATENT DOCUMENTS

| | | |
|---|---|---|
| CN | 106097480 X | 11/2016 |
| CN | 107452088 | 12/2017 |
| JP | 06-068392 | 3/1994 |
| JP | 10-320579 | 12/1998 |
| JP | 2001-109986 | 4/2001 |
| JP | 2009-211509 | 9/2009 |
| JP | 2010-211613 | 9/2010 |
| JP | 2011-204124 | 10/2011 |
| JP | 2012-155516 | 8/2012 |
| JP | 2020-109569 | 7/2020 |
| JP | 2020-194528 | 12/2020 |
| WO | 2016/157277 | 10/2016 |

OTHER PUBLICATIONS

Chinese Office Action for Chinese Patent Application No. 202310251785.9 mailed Sep. 27, 2025.

Non-Final Office Action for U.S. Appl. No. 18/125,162 dated Sep. 6, 2024.

Chinese Office Action for Chinese Patent Application No. 202410196992.3 mailed Jun. 11, 2026.

Japanese Office Action for Japanese Patent Application No. 2023-056964 mailed Sep. 1, 2026.

* cited by examiner

REPRODUCTION SYSTEM, REPRODUCTION METHOD, AND STORAGE MEDIUM

CROSS-REFERENCE TO RELATED APPLICATION

Priority is claimed on Japanese Patent Application No. 2023-056964, filed Mar. 31, 2023, the content of which is incorporated herein by reference.

BACKGROUND OF THE INVENTION

Field of the Invention

The present invention relates to a reproduction system, a reproduction method, and a storage medium.

Description of Related Art

In recent years, efforts to provide access to sustainable transportation systems that take into account the vulnerable among traffic participants have become active. To achieve this, concentration has been focused on research and development to further improve traffic safety and convenience through research and development related to driving assistance techniques.

The following Patent Literature 1 discloses an image display system that enables efficient on-site verification of a traffic accident by displaying images captured from various points along the traveling route of a car at the scene of a traffic accident in association with a floor plan. This system reproduces changes in field-of-view images that would be seen by a driver as a moving image.

[Patent Literature 1] Japanese Unexamined Patent Application, First Publication No. 2001-109986

SUMMARY OF THE INVENTION

Incidentally, in driving assistance techniques, reproduction of the status of a host vehicle in a specific traffic section using a moving image generated by computer graphics can also be considered. However, in this case, the movement history of the host vehicle may not be able to be accurately reproduced in the moving image generated by computer graphics due to missing data used for generating the moving image, the influence of noise caused by vibration of the host vehicle, or the like.

The present invention was contrived in view of such circumstances, and an object thereof is to provide a reproduction system, a reproduction method, and a storage medium that make it possible to accurately reproduce the movement history of a host vehicle. In the long run, this contributes to the development of a sustainable transportation system.

In order to solve the above problem, the present invention adopts the following aspects.

(1) According to an aspect of the present invention, there is provided a reproduction system including: an acquisition unit that acquires parameters related to a relative behavior of a host vehicle in a surrounding environment in a specific traffic section; a time-series parameter storage unit that stores the parameters in the specific traffic section in a time series as time-series parameter data; a reproduced moving image generation unit that generates a moving image for reproducing a movement history of the host vehicle in the specific traffic section on the basis of the time-series parameter data; and a display control unit that causes a display device to display the moving image, wherein the reproduced moving image generation unit includes a focusing point specification unit that specifies one or more focusing points of the host vehicle in the specific traffic section, an extraction unit that extracts a group of focusing point parameters related to the focusing points from the time-series parameter data stored in the time-series parameter storage unit, a calculation unit that calculates feature points at the focusing points by statistically processing the group of focusing point parameters, and a moving image generation unit that generates a moving image for reproducing a movement history of the host vehicle in the specific traffic section on the basis of the feature points.

(2) In the aspect of the above (1), a moving image data storage unit that stores possible movements of the host vehicle in the specific traffic section as at least one or a plurality of pieces of moving image data may be further included, the reproduced moving image generation unit may include a selection unit that selects generated moving image data from the at least one or plurality of pieces of moving image data stored in the moving image data storage unit on the basis of the time-series parameter data stored in the time-series parameter storage unit, and the moving image generation unit may generate a moving image for reproducing the movement history of the host vehicle in the specific traffic section on the basis of the generated moving image data selected by the selection unit and the feature points.

(3) In the aspect of the above (1) or (2), the calculation unit may statistically process the group of focusing point parameters by performing an averaging process or a filtering process on the group of focusing point parameters.

(4) In the aspect of any one of the above (1) to (3), the focusing point specification unit may specify the one or more focusing points on the basis of a change in the behavior of the host vehicle.

(5) In the aspect of any one of the above (1) to (3), the focusing point specification unit may specify the one or more focusing points on the basis of attributes of a road in the specific traffic section.

(6) In the aspect of any one of the above (1) to (5), the acquisition unit may include an external detection unit that acquires external information of the host vehicle and a vehicle sensor that acquires vehicle information of the host vehicle, and the time-series parameter data may include external time-series data which is generated on the basis of the external information and indicates an external status of the host vehicle in a time series and vehicle time-series data which is generated on the basis of the vehicle information and indicates a driving status of the host vehicle in a time series.

(7) In the aspect of the above (6), the external detection unit may include an image sensor that captures a forward image of the host vehicle, the external time-series data may include time-series positions of a stop line and a vehicle traffic division line on a road on which the host vehicle has traveled, and the vehicle time-series data may be input to the reproduced moving image generation unit through an in-vehicle communication network of the host vehicle.

(8) In the aspect of any one of the above (1) to (7), the reproduced moving image generation unit may generate a moving image for reproducing a movement history of another traffic participant whose path intersects with the host vehicle in the specific traffic section, together with the movement history of the host vehicle in the specific traffic section, on the basis of the time-series parameter data.

(9) In the aspect of the above (8), the reproduced moving image generation unit may use information relating to the other traffic participant included in the time-series parameter data to generate abstracted image data corresponding to the other traffic participant and display the image data as the other traffic participant in the moving image.

(10) In the aspect of any one of the above (1) to (9), the specific traffic section may be a point of intersection.

(11) According to an aspect of the present invention, there is provided a reproduction method including causing a computer of a reproduction system including an acquisition unit that acquires parameters related to a relative behavior of a host vehicle in a surrounding environment in a specific traffic section to: store the parameters in the specific traffic section in a time series as time-series parameter data; specify one or more focusing points of the host vehicle in the specific traffic section; extract a group of focusing point parameters related to the focusing points from the time-series parameter data; calculate feature points at the focusing points by statistically processing the group of focusing point parameters; generate a moving image for reproducing a movement history of the host vehicle in the specific traffic section on the basis of the feature points; and cause a display device to display the moving image.

(12) According to an aspect of the present invention, there is provided a computer readable non-transitory storage medium having a program stored therein, the program causing a computer of a reproduction system including an acquisition unit that acquires parameters related to a relative behavior of a host vehicle in a surrounding environment in a specific traffic section to: store the parameters in the specific traffic section in a time series as time-series parameter data; specify one or more focusing points of the host vehicle in the specific traffic section; extract a group of focusing point parameters related to the focusing points from the time-series parameter data; calculate feature points at the focusing points by statistically processing the group of focusing point parameters; generate a moving image for reproducing a movement history of the host vehicle in the specific traffic section on the basis of the feature points; and cause a display device to display the moving image.

According to the above aspects of the present invention, it is possible to provide a reproduction system, a reproduction method, and a storage medium that make it possible to accurately reproduce the movement history of a host vehicle.

DETAILED DESCRIPTION OF THE INVENTION

Figure 1:
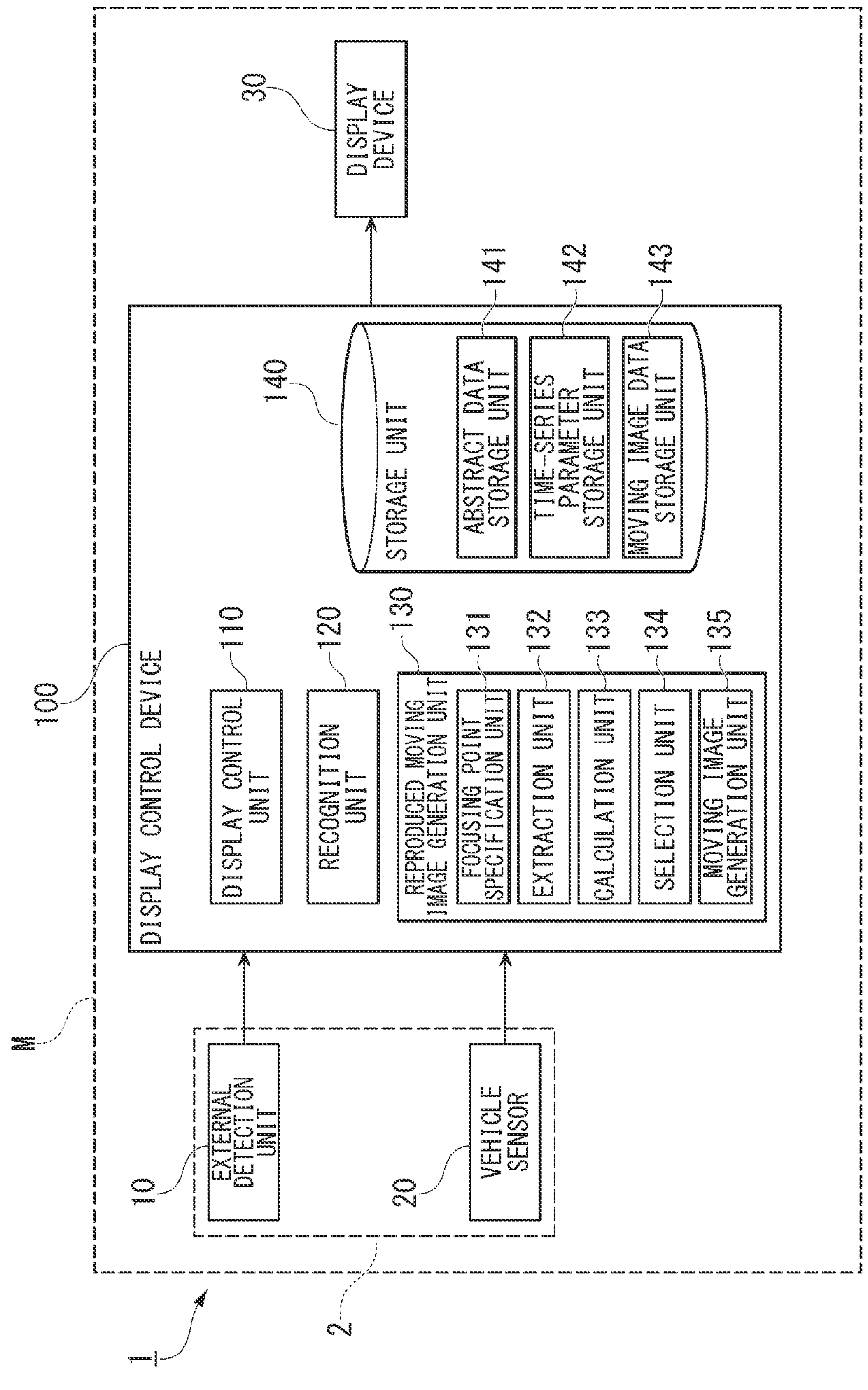
FIG. 1 is a block diagram illustrating a configuration example of a reproduction system according to the present embodiment.

Hereinafter, a reproduction system, a reproduction method, and a storage medium according to the present embodiment will be described with reference to the accompanying drawings. FIG. 1 is a block diagram illustrating a configuration example of a reproduction system 1 according to an embodiment. The reproduction system 1 is configured to use computer graphics to generate a moving image for reproducing the driving history of a vehicle (hereinafter also referred to as a reproduced moving image) in a section in which a plurality of traffic participants participate (hereinafter referred to as a specific traffic section). The reproduction system 1 is configured to display the generated reproduced moving image.

The reproduction system 1 includes, for example, an acquisition unit 2, a display device 30, and a display control device 100. The acquisition unit 2, the display device 30, and the display control device 100 may be mounted in a host vehicle M. These devices or instruments may be connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added.

The host vehicle M is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The acquisition unit 2 includes an external detection unit 10 and a vehicle sensor 20. The acquisition unit 2 acquires parameters related to the relative behavior of the host vehicle M with respect to the surrounding environment.

The external detection unit 10 is a variety of devices for acquiring external information of the host vehicle M. Examples of "external information" include information relating to the shapes and positions (relative positions viewed from the host vehicle M) of other traffic participants, road surface marks such as road partition lines painted on or attached to the road surface (hereinafter referred to as partition lines), pedestrian crossings, bicycle crossings, stop lines, road marks, traffic signals, railroad crossings, curbstones, median strips, guardrails, fences, and the like. Examples of "other traffic participants" include vehicles (such as two-wheeled vehicles or four-wheeled vehicles), pedestrians, and the like. In the example of the moving image shown in FIG. 2 or the like, an oncoming vehicle X is displayed as an example of "other traffic participants." In the example of the moving image shown in FIG. 2 or the like, the host vehicle M is turning right at the point of intersection, and the oncoming vehicle X is going straight. Therefore, the paths of the host vehicle M and the oncoming vehicle X intersect each other at the point of intersection.

The external detection unit 10 includes, for example, a camera, a light detection and ranging (LIDAR), a radar device, a sensor fusion device, and the like. Examples of the camera capable of being used include a digital camera using a solid-state imaging element such as a charge coupled device (CCD) or a complementary metal oxide semiconductor (CMOS), a stereo camera, and the like. The camera serving as the external detection unit 10 captures a forward image of the host vehicle M and outputs it as image data.

The vehicle sensor 20 includes a vehicle speed sensor that detects the speed of the host vehicle M, a gyro sensor that detects an angular velocity, an accelerator pedal sensor that detects the amount of operation of an accelerator pedal or the presence or absence of its operation, a brake pedal sensor that detects the amount of operation of a brake pedal or the presence or absence of its operation, an acceleration sensor that detects an acceleration, an orientation sensor that detects the orientation of the host vehicle M, and the like. The gyro sensor includes, for example, a yaw rate sensor that detects an angular velocity around a vertical axis.

The display control device 100 includes, for example, a display control unit 110, a recognition unit 120, a reproduced moving image generation unit 130, and a storage unit 140. The storage unit 140 includes an abstract data storage unit 141, a time-series parameter storage unit 142, and a moving image data storage unit 143. The functions of the display control unit 110, the recognition unit 120, and the reproduced moving image generation unit 130 are realized, for example, by a hardware processor such as a central processing unit (CPU) executing a program (software). Some or all of these components may be realized by hardware (a circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device (not shown) in advance, may be stored in a detachable storage medium (non-transitory storage medium) such as a DVD or a CD-ROM, or may be installed in the storage device by the storage medium being mounted in a drive device. Some or all of the functions of the display control unit 110, the recognition unit 120, and the reproduced moving image generation unit 130 may be realized by the same hardware.

The recognition unit 120 recognizes the situation such as the type and position of an object in the vicinity of the host vehicle M on the basis of external information which is output by the external detection unit 10. Examples of the "object" include some or all of a moving object such as a vehicle, a bicycle, or a pedestrian, a driving boundary such as a road partition line, a step difference, a guardrail, a shoulder, or a median strip, a structure installed on a road such as a road mark or a signboard, and a fallen object present (dropped) on a runway.

For example, when image data captured by the camera of the external detection unit 10 is input to the recognition unit 120, the recognition unit 120 may acquire the external situation by inputting the image data to a trained model that has been trained to output the result of image recognition. The type of object can also be estimated on the basis of the size of the object in the image data, the intensity of reflected waves received by the radar device of the external detection unit 10, and the like. The recognition unit 120 may acquire the movement speed of other traffic participants, for example, detected by the radar device using Doppler shift or the like.

The position of the object is recognized as, for example, a position in relative coordinates with a representative point (such as the center of gravity of the host vehicle M or the center of the drive shaft) as the origin (that is, a relative position with respect to the host vehicle M). Examples of the position of the object include the relative positions of another traffic participant, a left road partition line, a right road partition line, a left curbstone, a right curbstone, a stop line, a traffic signal, and the like as viewed from the host vehicle M.

The display control unit 110 generates time-series parameter data indicating the parameters acquired by the acquisition unit 2 in a time series. Specifically, the display control unit 110 generates external time-series data indicating the external status of the host vehicle M in a time series on the basis of the recognition result which is output by the recognition unit 120. The display control unit 110 generates vehicle time-series data indicating the driving status of the host vehicle M in a time series on the basis of the vehicle information which is output by the vehicle sensor 20. The time-series parameter data includes external time-series data and vehicle time-series data. The display control unit 110 causes the time-series parameter storage unit 142 to store the time-series parameter data.

The external time-series data includes, for example, as a time series, the distance from the host vehicle M to the left road partition line, the distance from the host vehicle M to the right road partition line, the distance from the host vehicle M to the left curbstone, the distance from the host vehicle M to the right curbstone, the distance from the host vehicle M to the stop line, the distance from the host vehicle M to a traffic signal, the type of another traffic participant, the relative position viewed from the host vehicle M, and the like.

The vehicle time-series data includes, for example, as a time series, a yaw rate, a vehicle speed, accelerator operation information, brake operation information, light operation information, blinker operation information, wiper operation information, hazard operation information, and the like.

The display control unit 110 determines whether to cause the reproduced moving image generation unit 130 to generate a reproduced moving image, whether to cause the display device 30 to display the reproduced moving image, and the like. The display control unit 110 executes control based on the determination result. For example, in a case where the display control unit 110 determines that the display device 30 is caused to display the reproduced moving image, the display control unit performs processing for causing the display device 30 to display the reproduced moving image.

The display device 30 displays the reproduced moving image generated by the reproduced moving image generation unit 130. In a case where the display device 30 is mounted in the host vehicle M, the display device 30 may display information images indicating various types of information to be presented to the driver of the host vehicle M in addition to the reproduced moving image. The display device 30 is, for example, a liquid crystal display (LCD) or the like built into the dashboard or instrument panel of the host vehicle M. The display device 30 may not be mounted in the host vehicle M.

The abstract data storage unit 141 stores abstracted image data (hereinafter referred to as abstract data) corresponding to the type of object. For example, in a case where the type of object is a vehicle, the abstract data may be prepared for each type of vehicle (such as a two-wheeled vehicle, a four-wheeled vehicle, or a large-size vehicle). The abstract data storage unit 141 may store abstract data corresponding to objects other than traffic participants (such as, for example, a traffic signal, a sign, or a building).

Figure 2:
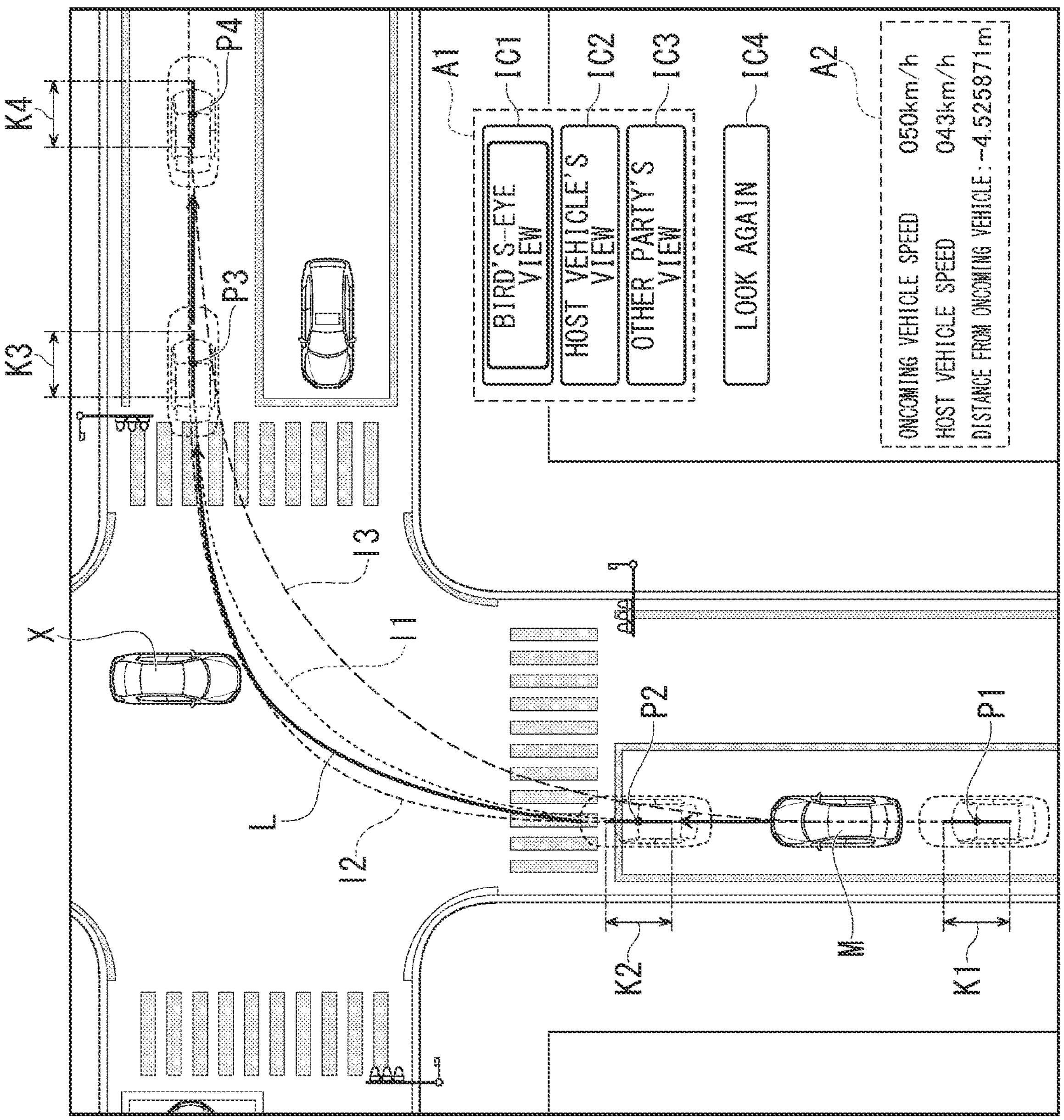
FIG. 2 is a diagram illustrating one situation of a reproduced moving image of bird's-eye view generated by the reproduction system of the present embodiment.

The reproduced moving image generation unit 130 includes a focusing point specification unit 131, an extraction unit 132, a calculation unit 133, a selection unit 134, and a moving image generation unit 135. The reproduced moving image generation unit 130 generates a reproduced moving image in a specific traffic section. FIG. 2 is an example of a reproduced moving image which is generated by the reproduced moving image generation unit 130 and displayed on the display device 30. FIG. 2 shows a moving image from a bird's-eye view. The bird's-eye view is a view looking down on a specific traffic section from above. The reproduced moving image includes a background image showing a specific traffic section (a point of intersection in the example shown in the drawing), the movement history of the host vehicle M, and the movement history of another traffic participant (the oncoming vehicle X in the example shown in the drawing).

First, the generation of a moving image for reproducing the movement history of the host vehicle M performed by the reproduced moving image generation unit 130 will be described. In the moving image data storage unit 143, the possible movements of the host vehicle M in a specific traffic section are stored in advance as a plurality of pieces of moving image data. For example, in a case where the host vehicle M turns right in a specific traffic section, a plurality of pieces of moving image data includes a plurality of supposed trajectories 11 to 13 of the host vehicle M shown in FIG. 2. The supposed trajectory 11 indicates the ideal trajectory of the host vehicle M that turns right. The supposed trajectory 12 indicates the trajectory of the host vehicle M in a case where the host vehicle M passes outside the ideal trajectory (takes a large turn). The supposed trajectory 13 indicates the trajectory of the host vehicle M when the host vehicle M passes inside the ideal trajectory (takes a shortcut). The moving image data stored in the moving image data storage unit 143 is prepared for each attribute of the specific traffic section. In a case where the specific traffic section is a point of intersection, the attributes of the specific traffic section include, for example, the type of point of intersection (such as a crossroad, a three-way intersection, or a Y junction), an intersection angle, a lane connection pattern, and the like.

The reproduced moving image generation unit 130 dynamically displays the movement history of the host vehicle M in a specific traffic section in a reproduced moving image on the basis of the time-series parameter data and a plurality of pieces of moving image data. The reproduced moving image generation unit 130 displays the trajectory L of the host vehicle M in the reproduced moving image.

The focusing point specification unit 131 specifies one or more focusing points (in the example of FIG. 2, focusing points P1 to P4) of the host vehicle M in a specific traffic section. The focusing point specification unit 131 specifies a position at which the behavior of the host vehicle M has changed as a focusing point. The position at which the behavior of the host vehicle M has changed is, for example, a position at which the vehicle speed or yaw rate of the host vehicle M has changed. For example, in a case where the host vehicle M turns right in a specific traffic section, the focusing point specification unit 131 specifies the focusing points P1 to P4 as follows. That is, the position of the host vehicle M when the accelerator operation of the host vehicle M is stopped and the host vehicle M starts to decelerate is defined as the focusing point P1. The position of the host vehicle M when the yaw rate of the host vehicle M increases (that is, when the host vehicle M starts to turn to the right) is defined as the focusing point P2. The position of the host vehicle M when the yaw rate of the host vehicle M decreases (that is, when the host vehicle M finishes turning) is defined as the focusing point P3. The position of the host vehicle M after a predetermined period of time (for example, one second) has elapsed from the focusing point P3 is defined as the focusing point P4.

The focusing point specification unit 131 may specify a position at which the attributes of a road have changed in a specific traffic section as a focusing point. The position at which the attributes of a road have changed is, for example, the position of a road surface mark, a road mark, a lane change, or the like. At these positions, the movement of the host vehicle M is restricted and the behavior of the host vehicle M changes. The position at which the attributes of the road have changed may be a position at which the behavior of the host vehicle M changes due to the involvement of other traffic participants. For example, in a case where the host vehicle M turns right in a specific traffic section, the host vehicle M temporarily stops due to the presence of the oncoming vehicle X going straight or a pedestrian crossing the road, and the behavior of the host vehicle M changes.

The extraction unit 132 extracts a group of focusing point parameters related to the focusing points P1 to P4 from the time-series parameter data stored in the time-series parameter storage unit 142 for each of the focusing points P1 to P4. Specifically, the extraction unit 132 extracts, as a group of focusing point parameters, time-series parameter data in focusing sections K1 to K4 including a predetermined time width before and after the times corresponding to the focusing points P1 to P4 from the time-series parameter data stored in the time-series parameter storage unit 142. The focusing sections K1 to K4 are, for example, sections of a few seconds before and after the focusing points P1 to P4.

The calculation unit 133 calculates feature points at the focusing points P1 to P4 by statistically processing the group of focusing point parameters extracted by the extraction unit 132 for each of the focusing points P1 to P4. The feature points include information such as, for example, the relative position of the host vehicle M with respect to the surrounding environment, the yaw rate of the host vehicle M, and the vehicle speed of the host vehicle M. Examples of the relative position of the host vehicle M with respect to the surrounding environment include the distance from the host vehicle M to the left road partition line, the distance from the host vehicle M to the right road partition line, the distance from the host vehicle M to the left curbstone, the distance from the host vehicle M to the right curbstone, the distance from the host vehicle M to the stop line, the distance from the host vehicle M to the traffic signal, and the like.

For example, the calculation unit 133 calculates feature points at the focusing points P1 to P4 by performing an averaging process on the group of focusing point parameters extracted by the extraction unit 132. That is, the calculation unit 133 calculates the average value of the parameters included in the group of focusing point parameters as the feature points at the focusing points P1 to P4. The calculation unit 133 may calculate the feature points at the focusing points P1 to P4 by performing a filtering process on the group of focusing point parameters extracted by the extraction unit 132 and removing noise included in the group of focusing point parameters.

The selection unit 134 selects generated moving image data to be used for generating a moving image from a plurality of pieces of moving image data stored in the moving image data storage unit 143 on the basis of the time-series parameter data. For example, the selection unit 134 estimates a trajectory close to the actual trajectory of the host vehicle M among the supposed trajectories 11 to 13 of the host vehicle M on the basis of the relative position, yaw rate, vehicle speed, and the like of the host vehicle M included in the time-series parameter data, and selects moving image data corresponding to the trajectory as generated moving image data. For example, in a case where the speed of the host vehicle M at the focusing point P2 is higher than the ideal speed of the host vehicle M at the focusing point P2 (the speed of the host vehicle M in a case where the host vehicle M takes the ideal trajectory 11), the actual trajectory of the host vehicle M is estimated to be close to the supposed trajectory 12, and the moving image data corresponding to the supposed trajectory 12 is selected. For example, in a case where the yaw rate of the host vehicle M at the focusing point P2 is greater than the ideal yaw rate of the host vehicle M (the yaw rate of the host vehicle M in a case where the host vehicle M takes the ideal trajectory 11), the actual trajectory of the host vehicle M is estimated to be close to the supposed trajectory 13, and the moving image data corresponding to the supposed trajectory 13 is selected.

The moving image generation unit 135 generates a moving image for reproducing the movement history of the host vehicle M in a specific traffic section on the basis of the feature points calculated by the calculation unit 133 and the generated moving image data selected by the selection unit 134. Specifically, the moving image generation unit 135 sets the position of the host vehicle M at the focusing points P1 to P4 on the basis of the feature points calculated by the calculation unit 133. For the section between the focusing point P1 and the focusing point P2, the moving image generation unit 135 interpolates the trajectory of the host vehicle M by linearly connecting the position of the host vehicle M at the focusing point P1 and the position of the host vehicle M at the focusing point P2. For the section between the focusing point P2 and the focusing point P3, the moving image generation unit 135 interpolates the trajectory of the host vehicle M on the basis of the position of the host vehicle M at the focusing points P2 and P3 and the reproduced moving image data selected by the selection unit 134. For the section between the focusing point P3 and the focusing point P4, the moving image generation unit 135 interpolates the trajectory of the host vehicle M by linearly connecting the position of the host vehicle M at the focusing point P3 and the position of the host vehicle M at the focusing point P4. The moving image generation unit 135 sets the speed of the host vehicle M at the focusing points P1 to P4 on the basis of the feature points calculated by the calculation unit 133. For the section between the focusing point P1 and the focusing point P2, the moving image generation unit 135 derives the acceleration of the host vehicle M from the difference between the speed of the host vehicle M at the focusing point P1 and the speed of the host vehicle M at the focusing point P2, and interpolates the speed of the host vehicle M so that the host vehicle M decelerates with the derived acceleration. For the section between the focusing point P2 and the focusing point P3, the moving image generation unit 135 interpolates the speed of the host vehicle M on the basis of the speed of the host vehicle M at the focusing points P2 and P3 and the reproduced moving image data selected by the selection unit 134. For the section between the focusing point P3 and the focusing point P4, the moving image generation unit 135 derives the acceleration of the host vehicle M from the difference between the speed of the host vehicle M at the focusing point P3 and the speed of the host vehicle M at the focusing point P4, and interpolates the speed of the host vehicle M so that the host vehicle M accelerates with the derived acceleration.

The reproduced moving image generation unit 130 generates a background image in a specific traffic section in which the host vehicle M has traveled on the basis of the external time-series data. The background image may include, for example, a road and surrounding structures (such as buildings, guardrails, or three-dimensional signs). The background image may be generated on the basis of abstract data stored in the abstract data storage unit 141. Specifically, the reproduced moving image generation unit 130 reads out the abstract data corresponding to the type of object recognized by the recognition unit 120 from the abstract data storage unit 141. For example, in a case where the recognition unit 120 recognizes the presence of an oncoming vehicle in front of the host vehicle M, the abstract data corresponding to the type of oncoming vehicle (such as a two-wheeled vehicle or a four-wheeled vehicle) is read out. The reproduced moving image generation unit 130 adjusts the shape of abstract data to be displayed in the reproduced moving image on the basis of the size of the object recognized by the recognition unit 120. For example, in a case where the recognition unit 120 recognizes the width dimension of an oncoming vehicle, the width of the abstract data indicating the oncoming vehicle is adjusted using the width dimension. Lines marked on the road such as the road partition line may be rendered (drawn) in the moving image on the basis of the geometric data recognized by the recognition unit 120 rather than on the basis of the abstract data stored in the abstract data storage unit 141.

The reproduced moving image generation unit 130 dynamically displays the movement history of other traffic participants in a specific traffic section in the reproduced moving image on the basis of the external time-series data. In a case where other traffic participants are stationary when the host vehicle M passes through a specific traffic section, the positions of the other traffic participants may be displayed statically in the reproduced moving image.

Figure 3:
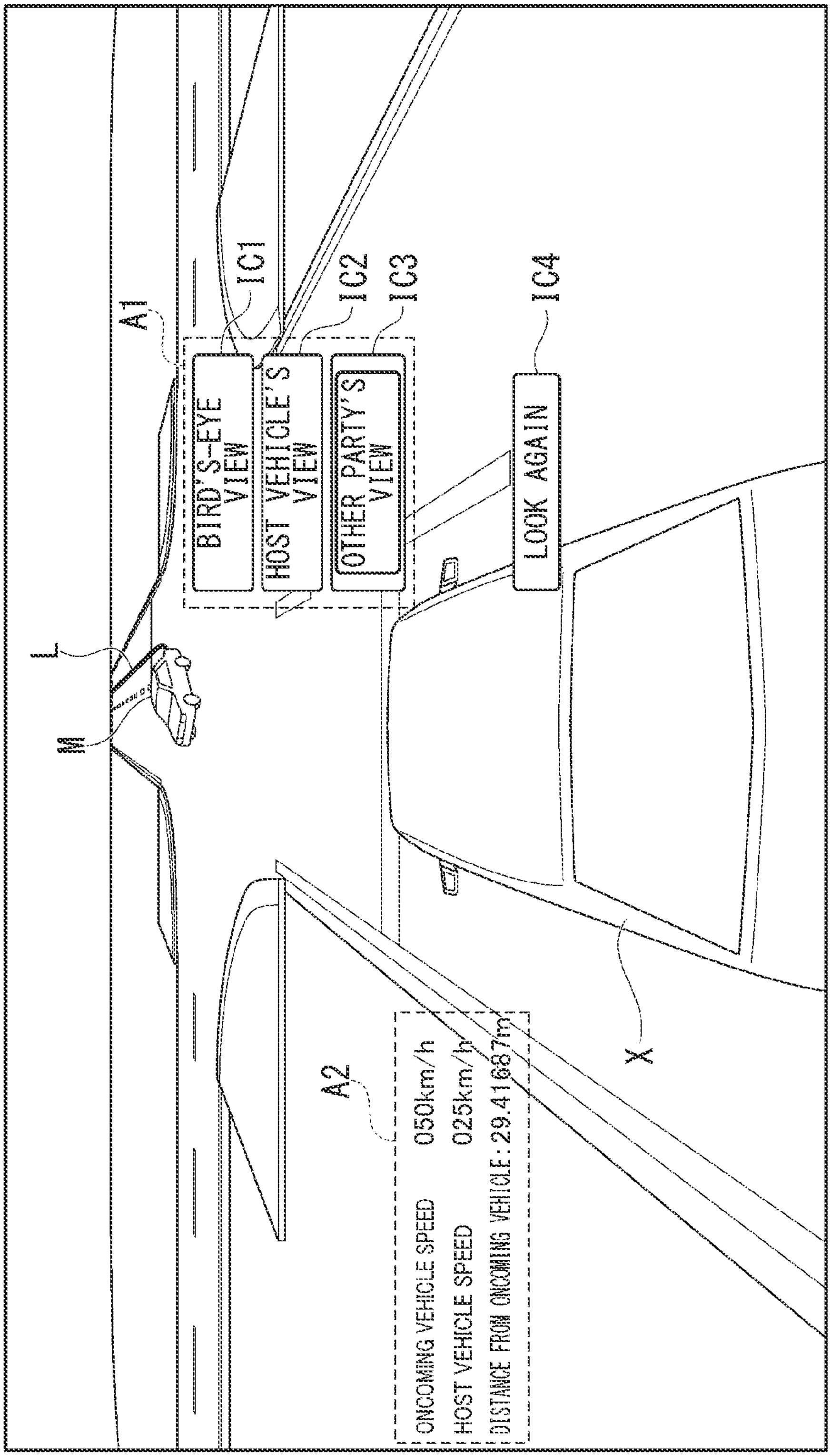
FIG. 3 is a diagram illustrating one situation of a reproduced moving image of another party's view generated by the reproduction system of the present embodiment.
Figure 4:
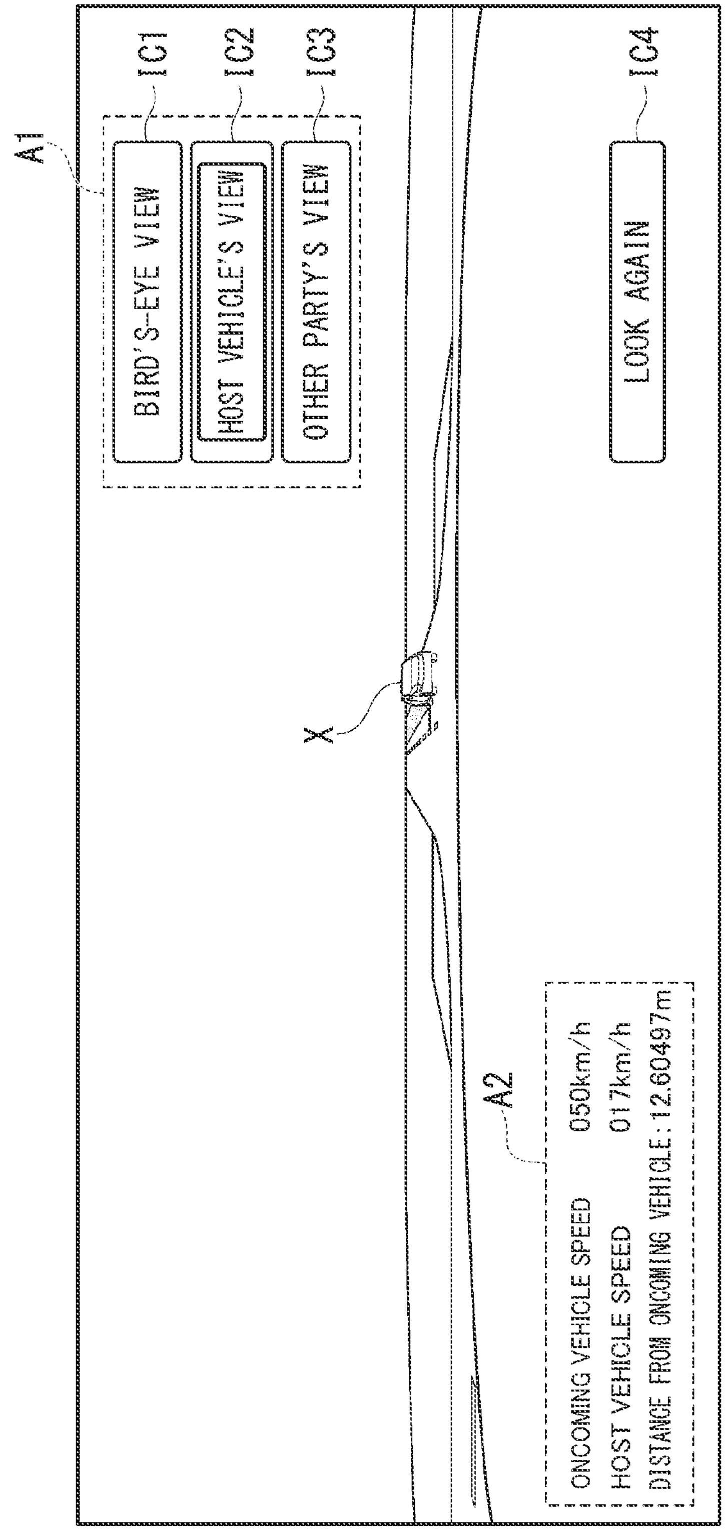
FIG. 4 is a diagram illustrating one situation of a reproduced moving image of a host vehicle's view generated by the reproduction system of the present embodiment.

The reproduced moving image generated by the reproduced moving image generation unit 130 and displayed on the display device 30 may be a moving image from the other party's view as shown in FIG. 3, or may be a moving image from the host vehicle's view as shown in FIG. 4. The other party's view is a view when the host vehicle M is viewed from the other traffic participant's side. Although the view of the oncoming vehicle X has been illustrated as the other party's view, a moving image of the host vehicle M viewed from any direction may be used. For example, the other party's view may be a view from which another traffic participant (such as a vehicle or a pedestrian) located diagonally behind the host vehicle M looks at the host vehicle M.

The background image may be displayed statically or may be displayed dynamically. For example, in the moving image of bird's-eye view shown in FIG. 2, the background image is displayed statically. In the moving image of the other party's view shown in FIG. 3 or host vehicle's view shown in FIG. 4, the background image is displayed dynamically in accordance with the movement of view (that is, the movement of the host vehicle M or the oncoming vehicle X).

As shown in FIGS. 2 to 4, the image displayed by the display device 30 may include a switch display region A1 and a traffic information display region A2. The switch display region A1 includes icons IC1 to IC3 for changing the view of the moving image. The icon IC1 is a graphical user interface (GUI) switch for selecting a moving image of bird's-eye view. The icon IC2 is a GUI switch for selecting a moving image of a host vehicle's view. The icon IC3 is a GUI switch for selecting a moving image of the other party's view. The image displayed by the display device 30 may include an icon IC4 which is a GUI switch for replaying a moving image. The icon IC4 may be included in the switch display region A1.

The display control unit 110 executes control corresponding to each of the icons IC1 to IC4 when a user operates these icons. For example, as shown in FIG. 2, when the icon IC2 (host vehicle's view) is selected in a case where the moving image of bird's-eye view is displayed, the display control unit 110 transmits a moving image output command to the reproduced moving image generation unit 130 to output the moving image of the host vehicle's view. Upon receiving this moving image output command, the reproduced moving image generation unit 130 causes the display device 30 to display the moving image of the host vehicle's view.

The reproduced moving image generation unit 130 may execute moving image generation every time it receives a moving image output command, and cause the display device 30 to display the generated moving image. Alternatively, the reproduced moving image generation unit 130 may have a storage area for storing the generated moving image, and upon receiving a moving image output command, may call up the moving image stored in the storage area and output it to the display device 30.

Information relating to the traffic of the host vehicle M and another traffic participant (for example, the oncoming vehicle X) in a specific traffic section (for example, a point of intersection) is displayed in the traffic information display region A2. In the examples of FIGS. 2 to 4, the speed of an oncoming vehicle (the speed of the oncoming vehicle X), the speed of the host vehicle, and the distance between the oncoming vehicle and the host vehicle M which correspond to the time series of the reproduced moving image are displayed in the traffic information display region A2. The traffic information display region A2 may not be displayed in the moving image. It may be possible to switch whether the traffic information display region A2 is displayed.

Figure 5:
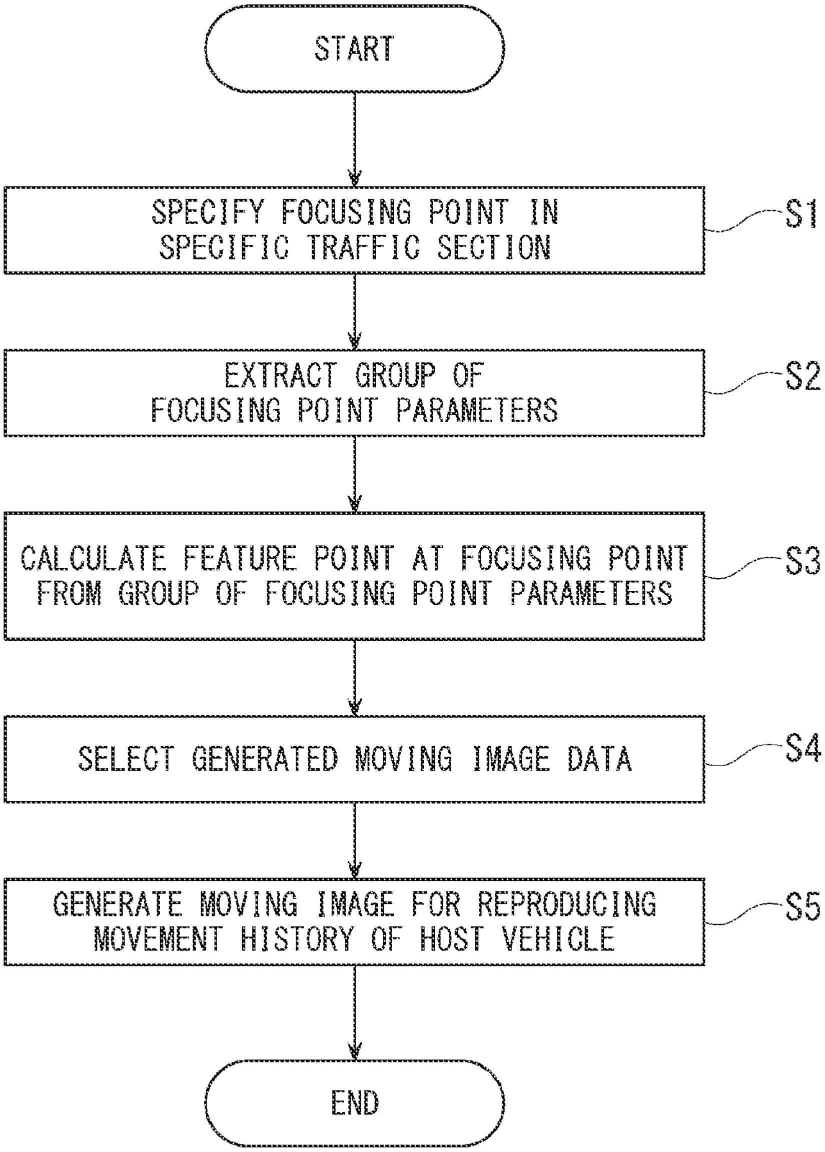
FIG. 5 is a flowchart illustrating an example of processing executed by the reproduction system of the present embodiment.

FIG. 5 is a flowchart illustrating an example of processing performed by the reproduction system 1 to generate a moving image for reproducing the movement history of the host vehicle M. This flowchart is an example, and processing may be performed along other flows.

In the example of FIG. 5, in step S1, the focusing point specification unit 131 specifies the focusing points P1 to P4 of the host vehicle M in a specific traffic section. In step S2, the extraction unit 132 extracts a group of focusing point parameters related to the focusing points P1 to P4 from the time-series parameter data stored in the time-series parameter storage unit 142 for each of the focusing points P1 to P4. In step S3, the calculation unit 133 calculates the feature points at the focusing points P1 to P4 by statistically processing the group of focusing point parameters extracted by the extraction unit 132 for each of the focusing points P1 to P4. In step S4, the selection unit 134 selects generated moving image data to be used for generating a moving image from a plurality of pieces of moving image data stored in the moving image data storage unit 143 on the basis of the time-series parameter data. Step S4 may be performed in parallel to steps S2 and S3. In step S5, the moving image generation unit 135 generates a moving image for reproducing the movement history of the host vehicle M in a specific traffic section on the basis of the feature points calculated in step S3 and the generated moving image data selected in step S4.

As described above, the reproduction system 1 of the present embodiment includes the acquisition unit 2 that acquires parameters related to the relative behavior of the host vehicle M with respect to the surrounding environment in a specific traffic section, the time-series parameter storage unit 142 that stores the parameters in the specific traffic section in a time series as time-series parameter data, the reproduced moving image generation unit 130 that generates a moving image for reproducing the movement history of the host vehicle M in the specific traffic section on the basis of the time-series parameter data, and the display control unit 110 that causes the display device 30 to display the moving image. The reproduced moving image generation unit 130 includes the focusing point specification unit 131 that specifies one or more focusing points P1 to P4 of the host vehicle M in the specific traffic section, the extraction unit 132 that extracts a group of focusing point parameters related to the focusing points P1 to P4 from the time-series parameter data stored in the time-series parameter storage unit 142, the calculation unit 133 that calculates feature points at the focusing points P1 to P4 by statistically processing the group of focusing point parameters, and the moving image generation unit 135 that generates a moving image for reproducing the movement history of the host vehicle M in the specific traffic section on the basis of the feature points.

According to such a reproduction system 1, the movement history of the host vehicle M in the specific traffic section can be reproduced as a moving image generated by computer graphics, and the movement history of the host vehicle M can be objectively shown to a driver. The feature points at the focusing points P1 to P4 are calculated by extracting a group of focusing point parameters related to the focusing points P1 to P4 from the time-series parameter data stored in the time-series parameter storage unit 142 and statistically processing the extracted group of focusing point parameters. A moving image for reproducing the movement history of the host vehicle M in the specific traffic section is generated on the basis of the feature points calculated in this way. Thereby, even in a case where there are omissions or noise in the time-series parameter data, the movement history of the host vehicle M in the specific traffic section can be accurately reproduced using data from which the omissions or noise has been removed.

The reproduction system 1 may further include the moving image data storage unit 143 that stores the possible movements of the host vehicle M in the specific traffic section as at least one or a plurality of pieces of moving image data, the reproduced moving image generation unit 130 may include the selection unit 134 that selects generated moving image data from at least one or a plurality of pieces of moving image data stored in the moving image data storage unit 143 on the basis of the time-series parameter data stored in the time-series parameter storage unit 142, and the moving image generation unit 135 may generate a moving image for reproducing the movement history of the host vehicle M in the specific traffic section on the basis of the generated moving image data selected by the selection unit 134 and the feature points. According to such a configuration, generated moving image data to be used for generating a moving image is selected from at least one or a plurality of pieces of moving image data indicating the possible movements of the host vehicle M, and a moving image for reproducing the movement history of the host vehicle M in the specific traffic section is generated on the basis of the selected generated moving image data and the feature points. Therefore, the movement history of the host vehicle M in the specific traffic section can be reproduced with a higher degree of accuracy.

The calculation unit 133 may statistically process the group of focusing point parameters by performing an averaging process or a filtering process on the group of focusing point parameters. According to such a configuration, it is possible to minimize variations in the data included in the group of focusing point parameters, and to generate a seamless moving image. Therefore, a user's conviction, reliability, and acceptability of the system are increased.

The focusing point specification unit 131 may specify one or more focusing points P1 to P4 on the basis of a change in the behavior of the host vehicle M. According to such a configuration, since a moving image for reproducing the movement history of the host vehicle M can be generated on the basis of the parameters related to the relative behavior of the host vehicle M at a position where the behavior of the host vehicle M has changed, it is possible to generate a moving image corresponding to the actual movement of the host vehicle M. Therefore, a user's conviction, reliability, and acceptability of the system are increased.

The focusing point specification unit 131 may specify one or more focusing points P1 to P4 on the basis of the attributes of the road in the specific traffic section. According to such a configuration, since a moving image for reproducing the movement history of the host vehicle M can be generated on the basis of the parameters related to the relative behavior of the host vehicle M at a position where the attributes of the road have changed in the specific traffic section, it is possible to generate a moving image corresponding to the actual movement of the host vehicle M. Therefore, a user's conviction, reliability, and acceptability of the system are increased.

The acquisition unit 2 may include the external detection unit 10 that acquires external information of the host vehicle M and the vehicle sensor 20 that acquires vehicle information of the host vehicle M, and the time-series parameter data may include external time-series data which is generated on the basis of the external information and indicates the external status of the host vehicle M in a time series and vehicle time-series data which is generated on the basis of the vehicle information and indicates the driving status of the host vehicle M in a time series. According to such a configuration, the movement history of the host vehicle M in the specific traffic section can be reproduced with a higher degree of accuracy.

The external detection unit 10 may include an image sensor that captures a forward image of the host vehicle M, the external time-series data may include time-series positions of a stop line and a vehicle traffic division line on a road on which the host vehicle M has traveled, and the vehicle time-series data may be input to the reproduced moving image generation unit 130 through an in-vehicle communication network (CAN) of the host vehicle M. According to such a configuration, a reproduced moving image can be generated using existing hardware resources mounted in the vehicle.

The reproduced moving image generation unit 130 may generate a moving image for reproducing a movement history of another traffic participant whose path intersects with the host vehicle M in the specific traffic section, together with the movement history of the host vehicle M in the specific traffic section, on the basis of the time-series parameter data. This makes it possible to reproduce the situation in the specific traffic section where the host vehicle M and the other traffic participant interfere with each other in an easy-to-understand manner.

The reproduced moving image generation unit 130 may use information relating to the other traffic participant included in the time-series parameter data to generate abstracted image data corresponding to the other traffic participant and display the image data as the other traffic participant in the moving image. In this manner, the use of the abstracted image data makes it possible to reduce the processing load more than, for example, in a case where live-action data of the other traffic participant is displayed in the reproduced moving image.

The above-described embodiment can be represented as follows.

A reproduction system including:

an acquisition unit that acquires parameters related to a relative behavior of a host vehicle in a surrounding environment in a specific traffic section;

a storage medium that stores computer-readable instructions; and a processor connected to the storage medium, wherein the processor executes the computer-readable instructions to store the parameters in the specific traffic section in a time series as time-series parameter data, specify one or more focusing points of the host vehicle in the specific traffic section, extract a group of focusing point parameters related to the focusing points from the time-series parameter data, calculate feature points at the focusing points by statistically processing the group of focusing point parameters, generate a moving image for reproducing a movement history of the host vehicle in the specific traffic section on the basis of the feature points, and cause a display device to display the moving image.

The technical scope of the present invention is not limited to the above-described embodiments, and various changes can be made without departing from the spirit of the invention.

For example, a portion of the reproduction system 1 (such as, for example, the display device 30 or the display control device 100) may be mounted in an instrument (such as a server, a personal computer, a smartphone, or a tablet terminal) that wirelessly communicates with the host vehicle M without being mounted in the host vehicle M. That is, the generation and reproduction of a moving image may be performed by an instrument which is remote from the host vehicle M.

As a specific example, the moving image generated by the reproduced moving image generation unit 130 may be stored in a storage unit included in a server or the like. Based on an operation on an instrument connected to the server, the reproduced moving image may be displayed on a display device included in the instrument. In this case, a driver can watch the moving image at home or the like and look back on his or her own driving operations. Alternatively, it is also possible to perform training using a reproduced moving image at a driving school or the like.

In the embodiment, a point of intersection has been used as an example of a specific traffic section. However, the specific traffic section does not have to be a point of intersection, and may be, for example, a point within a parking lot. Alternatively, the specific traffic section may be a connection point between a parking lot or the like and a road. In these cases, safer driving can also be encouraged by objectively showing the movement history of the host vehicle M to the driver.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A reproduction system comprising:

an acquisition unit that acquires parameters related to a relative behavior of a host vehicle in a surrounding environment in a specific traffic section;

a time-series parameter storage unit that stores the parameters in the specific traffic section in a time series as time-series parameter data, the time- series parameter data including time-series positions of a stop line and a vehicle traffic division line on a road on which the host vehicle has traveled;

a reproduced moving image generation unit that generates a moving image for reproducing a movement history of the host vehicle in the specific traffic section on the basis of the time-series parameter data; and a display control unit that causes a display device to display the moving image, wherein the reproduced moving image generation unit includes a focusing point specification unit that specifies one or more focusing points of the host vehicle in the specific traffic section, an extraction unit that extracts a group of focusing point parameters related to the focusing points from the time-series parameter data stored in the time-series parameter storage unit, a calculation unit that statistically processes the group of focusing point parameters by performing an averaging process or a filtering process on the group of focusing point parameters and calculates feature points at the focusing points by statistically processing the group of focusing point parameters, and a moving image generation unit that generates a moving image for reproducing a movement history of the host vehicle in the specific traffic section on the basis of the feature points.

2. The reproduction system according to claim 1, further comprising a moving image data storage unit that stores possible movements of the host vehicle in the specific traffic section as at least one or a plurality of pieces of moving image data, wherein the reproduced moving image generation unit includes a selection unit that selects generated moving image data from the at least one or plurality of pieces of moving image data stored in the moving image data storage unit on the basis of the time-series parameter data stored in the time-series parameter storage unit, and the moving image generation unit generates a moving image for reproducing the movement history of the host vehicle in the specific traffic section on the basis of the generated moving image data selected by the selection unit and the feature points.

3. The reproduction system according to claim 1, wherein the focusing point specification unit specifies the one or more focusing points on the basis of a change in the behavior of the host vehicle.

4. The reproduction system according to claim 1, wherein the focusing point specification unit specifies the one or more focusing points on the basis of attributes of a road in the specific traffic section.

5. The reproduction system according to claim 1, wherein the acquisition unit includes an external detection unit that acquires external information of the host vehicle and a vehicle sensor that acquires vehicle information of the host vehicle, and the time-series parameter data includes external time-series data which is generated on the basis of the external information and indicates an external status of the host vehicle in a time series and vehicle time-series data which is generated on the basis of the vehicle information and indicates a driving status of the host vehicle in a time series.

6. The reproduction system according to claim 5, wherein the external detection unit includes an image sensor that captures a forward image of the host vehicle, the vehicle time-series data is input to the reproduced moving image generation unit through an in-vehicle communication network of the host vehicle.

7. The reproduction system according to claim 1, wherein the reproduced moving image generation unit generates a moving image for reproducing a movement history of another traffic participant whose path intersects with the host vehicle in the specific traffic section, together with the movement history of the host vehicle in the specific traffic section, on the basis of the time-series parameter data.

8. The reproduction system according to claim 7, wherein the reproduced moving image generation unit uses information relating to the other traffic participant included in the time-series parameter data to generate abstracted image data corresponding to the other traffic participant and display the image data as the other traffic participant in the moving image.

9. The reproduction system according to claim 1, wherein the specific traffic section is a point of intersection.

10. A reproduction method comprising causing a computer of a reproduction system including an acquisition unit that acquires parameters related to a relative behavior of a host vehicle in a surrounding environment in a specific traffic section to:

store the parameters in the specific traffic section in a time series as time- series parameter data, the time-series parameter data including time-series positions of a stop line and a vehicle traffic division line on a road on which the host vehicle has traveled;

specify one or more focusing points of the host vehicle in the specific traffic section;

extract a group of focusing point parameters related to the focusing points from the time-series parameter data;

statistically process the group of focusing point parameters by performing an averaging process or a filtering process on the group of focusing point parameters;

calculate feature points at the focusing points by statistically processing the group of focusing point parameters;

generate a moving image for reproducing a movement history of the host vehicle in the specific traffic section on the basis of the feature points; and cause a display device to display the moving image.

11. A computer readable non-transitory storage medium having a program stored therein, the program causing a computer of a reproduction system including an acquisition unit that acquires parameters related to a relative behavior of a host vehicle in a surrounding environment in a specific traffic section to:

store the parameters in the specific traffic section in a time series as time- series parameter data, the time-series parameter data including time-series positions of a stop line and a vehicle traffic division line on a road on which the host vehicle has traveled;

specify one or more focusing points of the host vehicle in the specific traffic section;

extract a group of focusing point parameters related to the focusing points from the time-series parameter data;

statistically process the group of focusing point parameters by performing an averaging process or a filtering process on the group of focusing point parameters;

calculate feature points at the focusing points by statistically processing the group of focusing point parameters;

generate a moving image for reproducing a movement history of the host vehicle in the specific traffic section on the basis of the feature points; and cause a display device to display the moving image.

* * * * *